Feb. 25, 1941.     N. C. PRICE     2,233,031
AIRCRAFT POWER PLANT SUPERCHARGER
Filed June 13, 1939     4 Sheets-Sheet 3
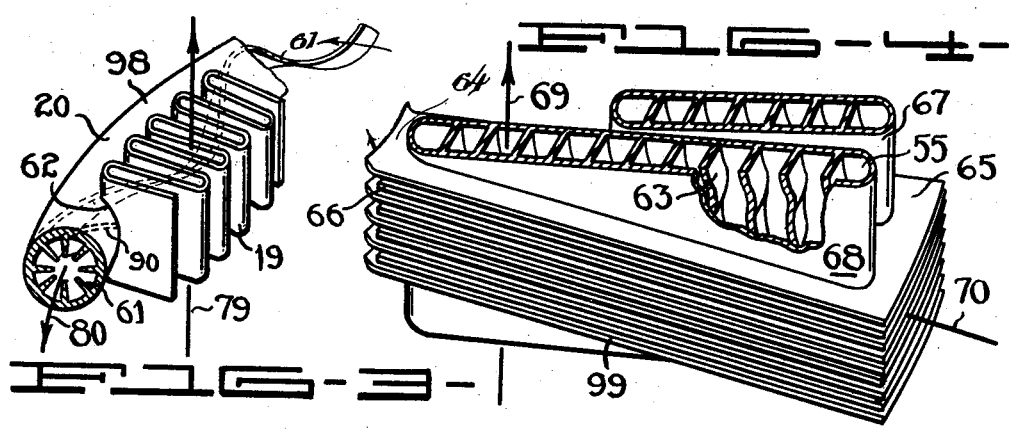
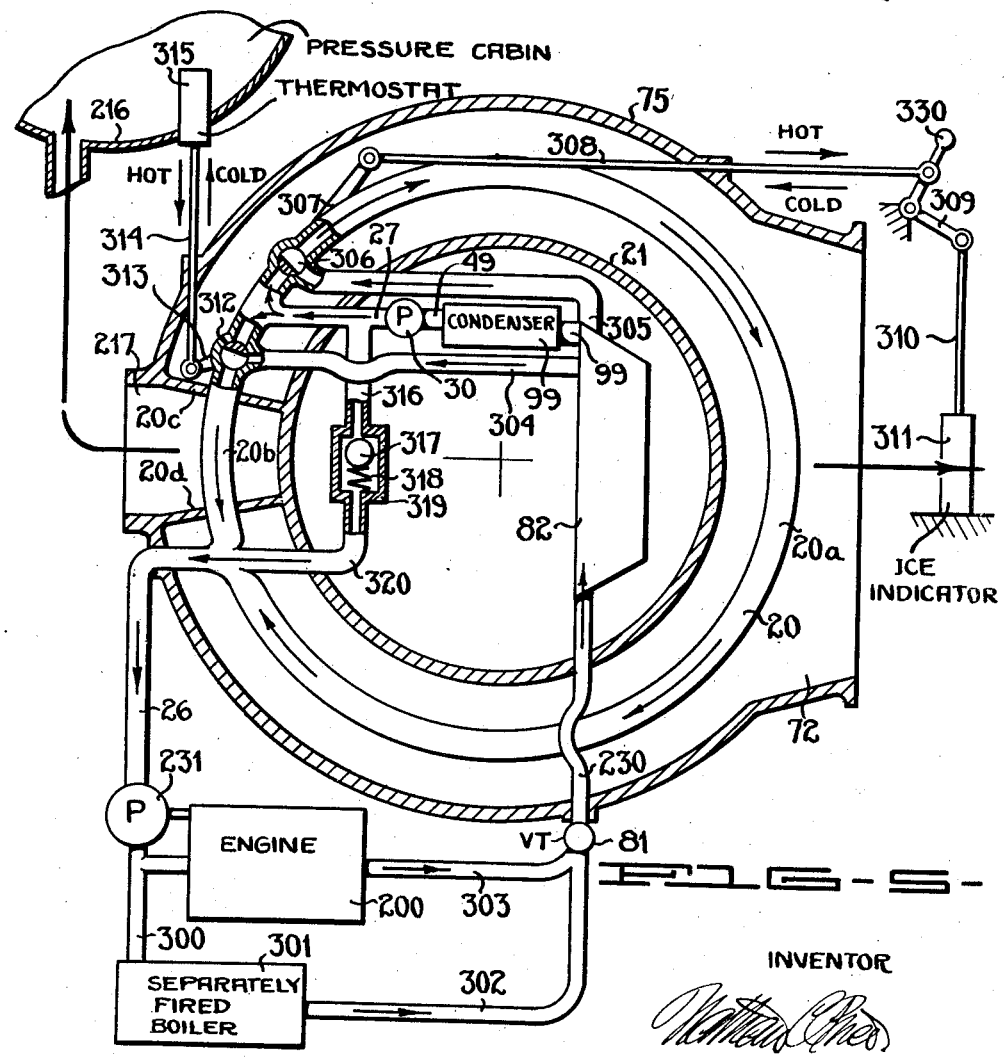
INVENTOR

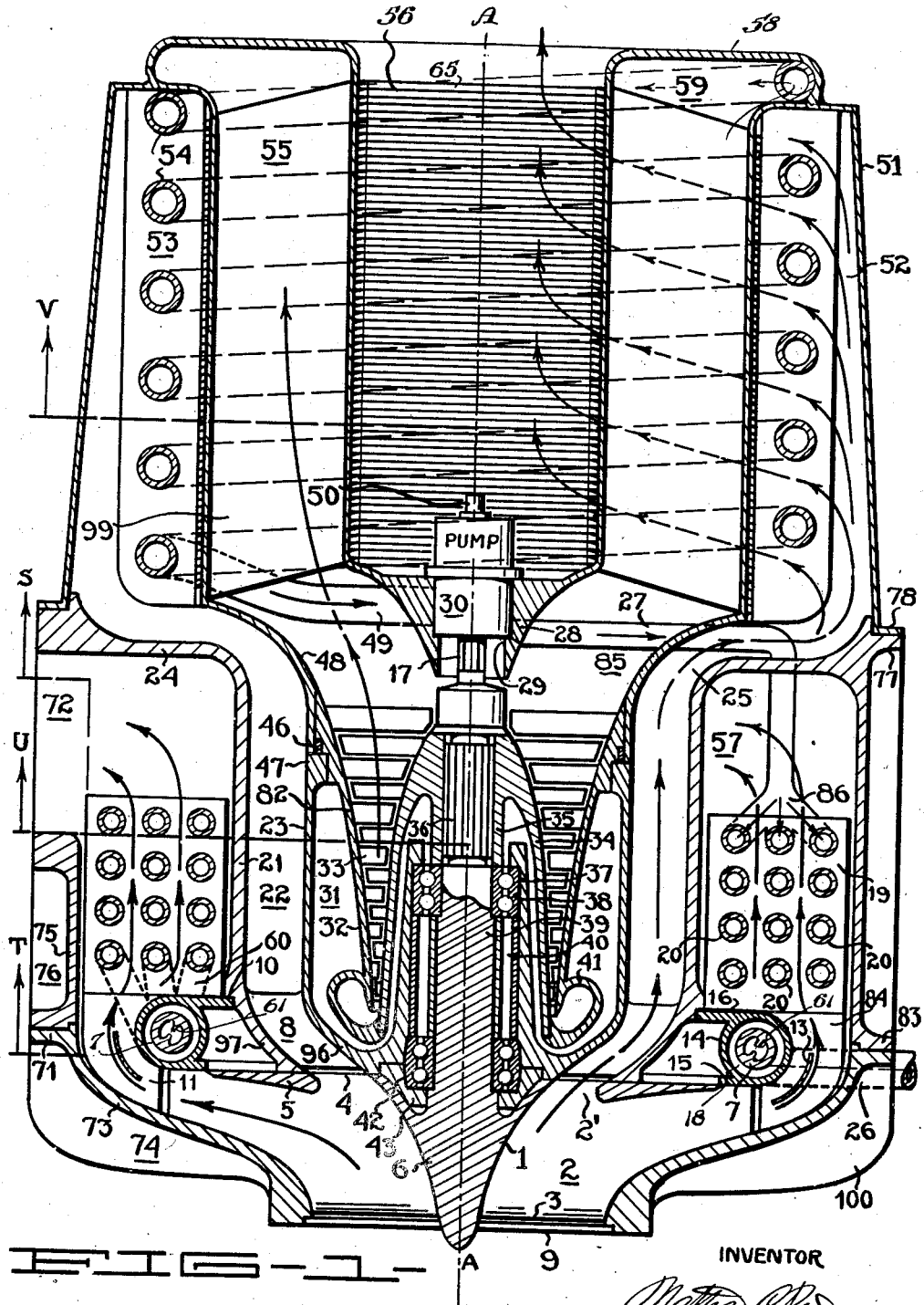
FIG-1-

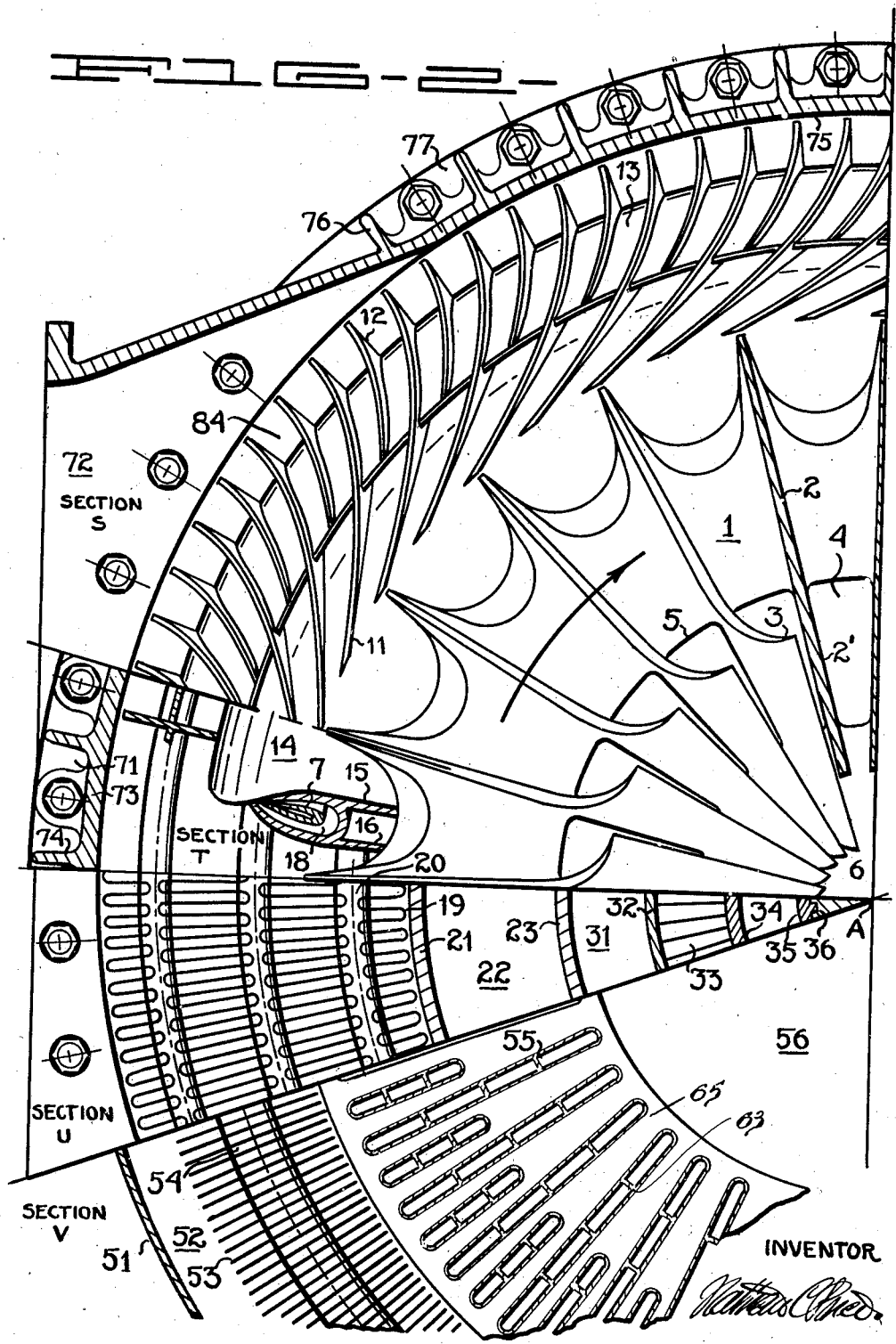

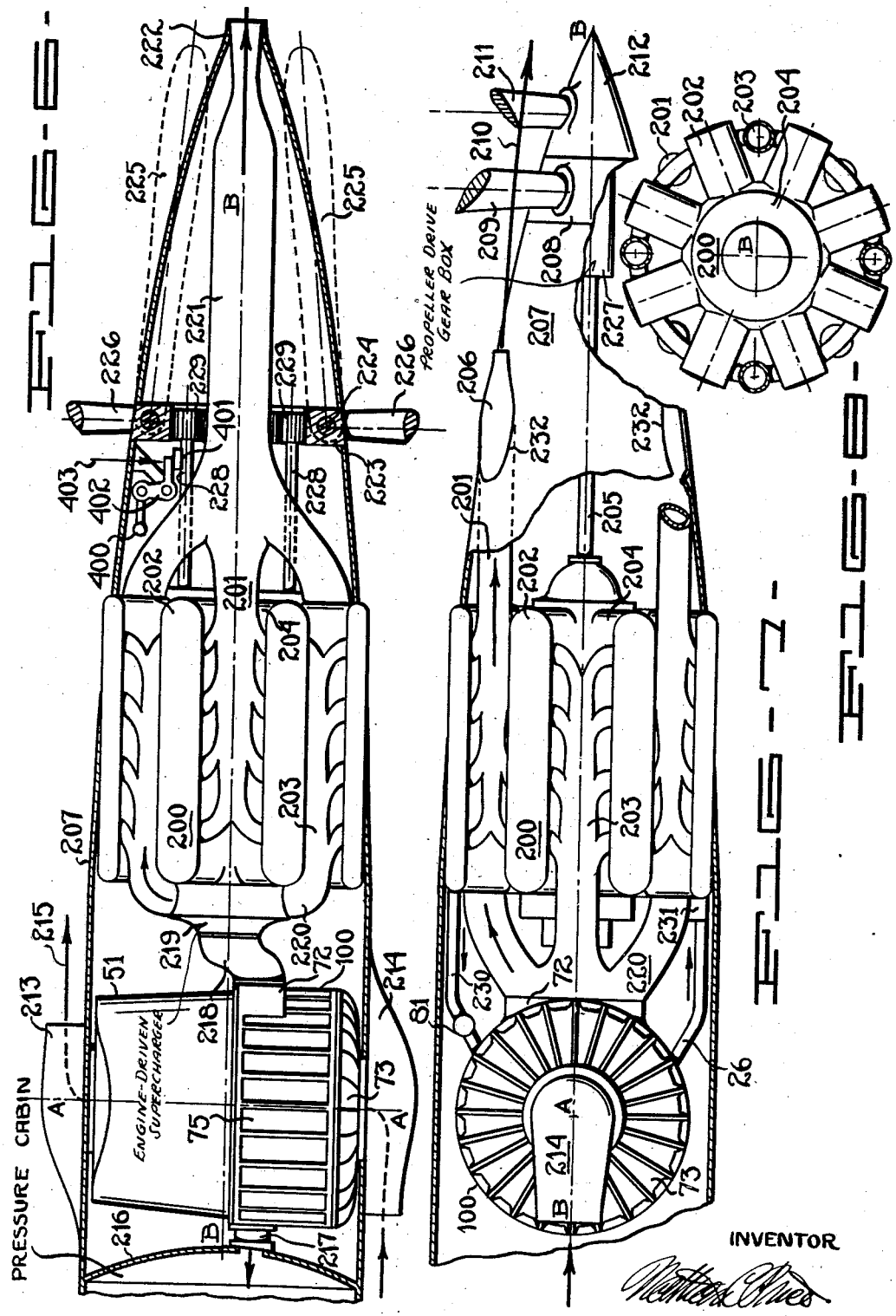

Patented Feb. 25, 1941

2,233,031

UNITED STATES PATENT OFFICE 2,233,031

AIRCRAFT POWER PLANT SUPERCHARGER

Nathan C. Price, Seattle, Wash., assignor to Sirius Corporation, a corporation of California Application June 13, 1939, Serial No. 278,917

10 Claims. (Cl. 60—96)

The invention creates more rational methods of inclusion of air compression and waste heat recovery apparatus in motors. It relates particularly to supercharging of aircraft engines and pertains generally to problems connected with the furnishing of atmospheric air to combustion chambers at extremely high altitudes as well as at lower altitudes. The invention is also useful for operating aircraft pressure cabins which accommodate passengers or freight, and for actuating aircraft compressed air power systems including de-icer boot systems, aerodynamic surface boundary layer controls, and the like. It embodies a unique method of compressing air for combustion chambers which must be cooled.

In addition the invention provides a practical solution for aircraft jet propulsion schemes. It serves as a mechanism for enabling movement of aircraft at velocities approaching or exceeding the velocity of sound.

It is an object of the invention to provide an air compressor of minimum weight and complication. Ease of installation and improved reliability are likewise sought. To this end, a centrifugal impeller, a diffuser, an intercooler, a driving turbine, a vapor condenser, and an air circulator for the condenser are interconnected in novel fashion in an integral unit. The proximity and particular arrangement of the elements composing the unit produce functional relationships in each of the elements constituting an improvement in operational efficiency.

Accordingly the impeller cooperates with a more efficient diffuser, characterized by elimination of turbulence and undue frictional pressure drop in the air being pumped. Furthermore the diffuser is peculiarly formed to control the temperature of the air. The diffuser possesses a shape which makes it ideal as a heat transmission surface. The relatively small and unavoidable skin friction therein serves to promote desired heat transfer. Therefore the pressure air can be considerably cooled for use in internal combustion engines. The heat from the air is converted into power for driving the impeller. The reduction of combustion air temperature suppresses engine detonation and increases the volumetric efficiency of the engine induction system.

Under certain circumstances the heat transfer process in the diffuser may be reversed from cooling to heating of the air, subject to controls. Thus icing conditions in the engine carburetor may be overcome or the engine more quickly started by adding heat to the compressed air.

For further example, the diffuser temperature may be varied, subject to appropriate regulation, increased or lessened to maintain comfortable conditions in a pressure cabin.

It is an objective of the invention to provide a supercharger of more universal use in the aircraft through provision of special air withdrawal connections in the supercharger at different pressure and temperature levels, yet without necessity to resort to duplication of moving parts. Relatively high pressure is made available for alimentation of engine combustion chambers. However a part of the air is compressed only to relatively low pressure for purposes exemplified by cooling of working vapor condensers. These arrangements obviate recourse to wasteful throttling of the air at the highest pressure level to a lower pressure level. Accordingly power is saved.

The supercharger of the invention is constructed to provide pressure air at a given temperature level for one consumer and simultaneously at a different temperature level for another consumer. Thus cool air may be required for the propelling engine yet the supercharger delivers warmer air for the pressure cabin or for de-icing boots on the leading edges of the wings.

It is a still further objective of the invention to provide a supercharger which is capable of independent operation. Accordingly the supercharger can start the main propulsion engine by pumping heated and compressed air into it. The air being delivered from the supercharger may be maintained at a comparatively high temperature during the warm-up period to reduce the length of time required to prepare engines for flight.

It is an objective of the invention to supply an all-purpose air compressor for aircraft systems, which is capable of functioning during inactivity of the aircraft propulsion system, yet which recovers waste heat from the engine when the aircraft is being propelled.

It is desired to provide a supercharger for aircraft which considerably improves the efficiency of the power plant as a whole, and which reduces aerodynamic drag, in particular the parasite resistance ordinarily incidental to accomplishing the cooling of the aircraft engine.

It is a further objective to supply a supercharging system having the most efficient flow passages consistent with effective transmission of heat to or from the compressed air, and to include the most efficient structure for instrumentalities involved in operation of the impeller.

It is an object to provide an aircraft power plant supercharger combination which enables flight at a velocity approaching or even exceeding that of sound. It is also intended to create a combination which allows the aircraft to be efficiently propelled at all speeds up to the maximum. Arrangements are also provided for transition of the propulsive thrust effort from a screw propeller to an exhaust gas jet in order to enable continuous flight under power from sea level up to the stratosphere, and from a standstill up to the velocity greater than that of sound.

With these and other objectives in mind, as will appear hereafter, my invention comprises the novel parts and the novel arrangement thereof relative to the aircraft and to the aircraft power plant.

Figure 1 diagrammatically represents a section of a typical form of the supercharger along the central axis thereof.

Figure 2 is a schematic representation of transverse sections of the supercharger of Figure 1 viewed from the air inlet end.

Figure 3 is a perspective view of a fragment of the combined diffuser and temperature conditioner of the supercharger.

Figure 4 is a perspective view of a fragment of the condenser core employed in the supercharger unit.

Figure 5 is a schematic representation of the flow control arrangement associated with the installation of the supercharger in conjunction with an aircraft engine and an aircraft pressure cabin.

Figure 6 is a diagrammatic representation of the supercharger installed in an aircraft adapted for operation in the stratosphere at extremely high velocity.

Figure 7 is a representation of an installation of the supercharger in conjunction with an aircraft power plant adapted for high altitude operation at high speed.

Figure 8 represents an end view of the internal combustion engine cooperating with the supercharger to propel the aircraft shown in Figures 6 and 7.

In Figure 1 air is compressed in a supercharger unit 100 by a centrifugal impeller 1 having a number of radial blades 2, a conical hub 6 with apex pointed downward, and a driveshaft 39 extending upward along a principal axis A of the unit 100. The air is first compressed to a relatively small extent by curled lips 3 at the lower edges of the blades 2 adjacent to an axial inlet 9 at the bottom of the supercharger unit, as the impeller rotates at high speed and scoops the air. A portion of the indrawn air flows from the lips 3 in a generally axial and somewhat radial direction about the surface of the hub 6 into an annular discharge orifice 4 between the inner diameter of an annular backing plate 5 and the greatest diameter of the hub 6.

The plate 5 serves to support the upper edges of the outer portions of the blades 2. Each blade 2 forms a spoke 2' between the hub 6 and the plate 5. Air supplied to the orifice 4 is driven upward into the spaces between radial diffuser vanes 8 arranged at the entrance of an annular duct 22 which is coaxial with the shaft 39. A comparatively low velocity is imparted to the air flowing adjacent to the hub 6, therefore only a relatively small pressure rise is produced in the air beyond that already caused by the lips 3 as the air decelerates between the vanes 8. In a representative case the air in the inlet 9 may be at a pressure of .3 of an atmosphere and at a temperature of 0 degrees Fahrenheit, but in the duct 22 it will exist at a pressure of .4 of an atmosphere and at a temperature 40 degrees Fahrenheit.

The air in the duct 22 is in a condition suitable for extraction of heat from a condenser core, as will be described later. However the remainder of the air drawn into the impeller is to be compressed to a far greater extent, to 1.1 atmosphere pressure for example, for alimentation of a power plant and a pressure cabin. To this end the air is permitted to flow radially outward between the blades 2 wherein it gains high tangential velocity and further compression. The air is released from the periphery of the impeller 1 into a toroidal diffuser 84 which commences in the plane of the impeller but which curves upward about a hollow tubular ring 14 directly above the periphery of the impeller. The ring has a pitch diameter approximately equal to the diameter of the impeller. The upward change of direction of the air within the diffuser 84 is aided by the presence of an annular turning vane 13 generated radially and spaced from the ring about half way toward a circular bottom plate 73 of the supercharger. The plate 73 bounds the lower side of the impeller 1 and is provided with external radial stiffening ribs 74 extending from the inlet 9 outward to a flange 71 of the plate, which serves as an attachment to a flange 83 of a barrel 75 encompassing the diffuser 84.

The lower end of the shaft 39 is supported within a hollow spindle 37 by a ball bearing 42 and the upper end by a ball bearing 38. Between the bearings is an annular space 40 which serves as a storage space for lubricant. A cap 43 locks the bearings axially within the spindle 37. A conical shell 96 supports the base of the spindle and forms an inner boundary for the flow of air between the vanes 8 in cooperation with a coaxial conical shell 97 which acts as an outer boundary.

An upper end 24 of the barrel 75 is invaginated as a tube 21 which joins the shell 97. The vanes 8 form bridges between the shells 96 and 97, completing the support of the shaft 39 in the barrel 75. The spindle 37 extends upward from the shell 96 into a conical turbine wheel 34 of a turbine 82. The apex of the wheel has an inwardly directed hub 35 which engages a spline 36 above the bearing 38 and on the shaft 39. The described supports for the impeller 1 and for the wheel 34 are ideally suited from the standpoints of compactness, durability, and non-interference with the various passages conducting air or working fluid.

The compressed air from the diffuser 84 is collected in an annular chamber 57 of the barrel 75 after having swept a pack of heat conductive ribbons 19 attached to some heat exchanger tubes 20 in the lower part of the chamber. The air is delivered from an outlet 72 to the engine or to other consumers. The temperature of the air in the chamber 57 may be at about 300 degrees Fahrenheit by virtue of the hyper-adiabatic compression which occurs in the impeller and diffuser, or on the other hand at about only 100 degrees Fahrenheit due to heat liberation in the diffuser, as will be described.

The temperature of the air at the inlet 9 is ordinarily raised from a considerably lower atmospheric value by ramming action in a scoop 214 exposed to the air flowing about the aircraft and feeding the unit 100, as illustrated in Figures 5 and 6. Thus, in the exemplary case, the previously cited air conditions at the inlet 9 may result from flight at 650 miles per hour at 40,000 feet altitude, where the air temperature is lower than minus 60 degrees Fahrenheit and the pressure less than .2 of an atmosphere.

In Figure 1 a conical turbine casing 32 surrounds some buckets 33 of the turbine 82. A nozzle ring 61 is attached to the lower and smaller end of the casing 32 and is enclosed in an annular space 31 encompassed by a coaxial tube 23 which extends upward from the shell 96.

The tube 23 and the tube 21 define the annular duct 22 and restrain the air to flow to a region 25 where the direction of motion of the air becomes radial. The cooling air then passes over the end 24 into an annular duct 52 between a coaxial inverted cup 51 and a cylindrical condenser 99. The duct 52 distributes the air to the spaces between some transverse fins 53 of a helical tube 54 wound about the sides of the condenser 99. Subsequently the air flows radially inward to a central bore 56 through interstices in the condenser. A basal flange 76 of the cup 51 joins a flange 77 at the top of the barrel 75. Some longitudinal stiffening ribs 78 extend from the flange 83 to the flange 77.

Working vapor, such as steam at a pressure of 250 atmospheres and at a temperature of 900 degrees Fahrenheit for example, is admitted to the ring 61 and passes through the buckets 33, thereby causing the turbine 82 to drive the impeller 1. Due to the shape of the wheel 34, the vapor issues from the turbine in a substantially unobstructed space 85 and is then guided by a diffuser 40 and by a central cone 28 into numerous slots 55 of the condenser 99. The vapor flows upward along the slots 55 to a crown chamber 39, at which point the vapor is nearly or completely condensed at a temperature of 150 degrees Fahrenheit, for example. Thence the condensate flows downward in the tube 54 to a transfer tube 49, which feeds a pump 30 mounted in a bore 29 of the cone 28. The condensate, cooled to 60 degrees Fahrenheit for example, is forced by the pump 30 along a transfer tube 27 and through a manifold 86 to the tubes 20, wherein it becomes reheated, and finally is collected in a manifold 60 to be directed into the ring 14, where it attains a temperature of 260 degrees Fahrenheit for example. The condensate is discharged from the ring 14 and from the unit 100 through an outlet 26.

The pump 30 is rotated by a drive shaft 17 connected to the upper end of the shaft 39. The pump is advantageously located in the cone 28, because it is swept by cooling air in the bore 56 and therefore is effectively cooled to prevent vaporization at its inlet. Furthermore, the location of the pump opposite the bottom and along the axis of the condenser 99 permits liquid to be drained from the condenser under all conditions of flight. Ordinarily during level flight or especially during "pull out" from a dive, there will be a positive head of condensate in the tube 54 tending to prevent cavitation or vapor-lock at the pump inlet. Even during inverted flight the pump is so positioned that it can draw all the condensate from the condenser without vapor-lock resulting, because the distance through which the condensate must be lifted is small. Lateral or fore and aft acceleration of the aircraft will also be unable to cause vapor-lock to occur because of the central position of the pump. Thus the particular placement of the pump, assisted by cooling from the condenser air, insures reliable operation of the pump at all times. An auxiliary drive 50 is projected from the top of the pump along the axis A.

In order to facilitate disassembly of the unit 100, the diffuser 40 is joined to the casing 32 and to a flange 67 of the tube 23 by a resilient gasket ring 46. Therefore the condenser assembly can be lifted from the barrel 75 following disconnection of the flange 76 from the flange 77.

A circumferential shoulder 10 at the juncture of the shell 97 with the tube 21 retains an inwardly projecting web 16 of the ring 14. A web 15 of the ring 14 acts as an air pressure seal in cooperation with the plate 5. An inner tube 7 enclosed by the ring 14 forms an annular flow channel of high velocity, to improve the rate of heat transmission between the condensate and the air.

The uppermost sector of Figure 2 illustrates a fragment of the impeller 1, the diffuser 80, and a section S of the barrel 75 viewed from below with the plate 73 removed. The numerous closely spaced diffuser vanes 11 are formed as thin plates generating tangentially from the periphery of the impeller in a direction corresponding to the direction of rotation of the impeller. The vanes 11 tend to become radial with respect to the axis A as they become more distant from the impeller, therefore in order that the air may retain its filamentous flow in the increasing gap between the vanes, some inter-vanes are inserted adjacent to the turning vane 13, as shown at 12.

The vanes 11 and 12 are bonded to the ring 14 and to the turning vane 13, so that in addition to converting air velocity head into pressure head, heat is conducted at a high rate from the air into the fluid contained in the channel 13. The diffuser 84 is highly efficient from the standpoint of compression, because the air is guided by many thin walls to prevent turbulence. Furthermore the air is closely controlled by the described structure and the divergence between the vanes and the curvature of the vanes can be made more abrupt so that the space requirements of the diffuser are relatively small. The numerous thin vanes embody ideal heat transfer surface for delivering heat of air compression into the ring 14. Even unavoidable skin friction in the diffuser serves the useful purpose of producing heat transfer. However the viscosity of air is roughly proportional to the temperature and this effect results in reduction of boundary layer friction in the diffuser, because the diffuser vanes are cooled by condensate. As a consequence the efficiency of the diffuser is appreciably improved.

The next lower sectors of Figure 2, designated as sections T and U of Figure 1, illustrate the vanes of the diffuser 84 in transverse section at the plane of the ring 14, and portray the arrangement of the heat conductive ribbons 19 in thermal contact with the helical tubes 20.

Figure 3 illustrates the latter construction more precisely. The ribbons 19 comprise folds of thin metallic strip attached laterally and transversely to the side of the tube 20 and recessed at the ends of the folds to form some joints 62 conforming to the circular shape of the tubes 20. Partially cooled air from the spaces between the vanes 11 and 12 passes between the folds of the ribbon 19, as represented at 79. At 80 the condensate within the tube 20 is required to pass in heat transferring relationship with some radial lands 61 on the inner surface of the tube 20, which are helical as at 90.

Details of the condenser 99 are revealed in Figure 4 and in the lowest sector of Figure 2, designated as section V of Figure 1. The path of flow of the cooling air between some transverse fins 65 formed about the slots 55 is represented by 70. The edges of the fins 65 adjacent to the bore 56 merge into upturned flanges 64 to direct the air upward and out of the bore 56. Some alternate fins 66 between the fins 65 have the inner diameters slightly larger than those of the flanges 64, in order to provide a more uniform flow passage and less restriction adjacent to the flanges 64. The flow of working vapor being condensed in the slots 55 is represented at 69. The slots 55 are defined by flattened tubes 67 and 68 alternating respectively in radial width with regard to the axis A, in order to provide a more uniform passage area for the cooling air and to prevent the velocity of the cooling air from being unduly increased as it becomes heated. Numerous wavy strips 63 are directeed axially along the slots 55 and bridge the relatively narrow tangential width of the tubes 67 and 68. The presence of the strips 63 considerably increases the area for heat transfer from the exhaust working vapor to the tubes 67 and 68, and the undulating form creates turbulence, which increases the heat transmission.

Generally, the conduits handling working fluid, such as the ring 14, the tube 20, or the tube 54 are constructed from relatively hard corrosion resistant metal, such as an alloy of copper and nickel.

However the vanes 11 and 12, the ribbons 19, the fins 53, and the fins 65 and 66 are preferably constructed from an alloy of comparatively high thermal conductivity, such as copper combined with small quantities of silver and chromium, and bonded to their respective tubes by welding in a controlled atmosphere furnace.

In accordance with the foregoing illustrations, the exhaust working vapor issuing from the turbine 82 is directed into passages of relatively great heat absorptive properties, yet with a minimum of wasteful flow resistance, in part because the passages generally conform to the shape of the body of vapor flowing from the turbine at high velocity. It has been found that the passages provided for the cooling of the working vapor in the core have a high rate of heat dissipation in comparison with their frictional pressure drop. Upon reaching the upper end 58 of the condenser the vapor is nearly condensed, and may then flow down the tube 54 to be cooled well below the saturation temperature.

The condensate, cooled to 60 degrees Fahrenheit for example, is appropriate for absorption of heat in the intercooler and diffuser. The illustrated arrangements permit a recovery of heat ordinarily lost from the air being cooled, and this recovery is accomplished with complete counterflow and minimum frictional pressure drop being imposed upon the pressure air. The compressed air is discharged from the intercooler into a space which is properly adapted to collect the air and to deliver it to the consumer.

Ordinarily in aircraft the intercooling of supercharged air involves the use of bulky passages for the cooling air and it is furthermore difficult to bring the cooling air to these passages. On the other hand it is also inconvenient to divert the compressed air to a remotely placed intercooler. In ordinary supercharger installations serious aerodynamic drag is involved in forcing cooling air into the intercooler and it is not practical to combine the intercooler with the diffuser, because of the bulkiness of the spaces required for cooling air. These serious disadvantages are eliminated by the invention.

In Figure 5 the tube 20 is subdivided into a region 20a, which affects the temperature of the air being supplied to the outlet 72, and into a region 20b, which affects the temperature of the air being supplied to a duct 217 connected to a pressure cabin 216. Ordinarily the outlet 72 supplies an engine combustion chamber and therefore a thermal device, such as an ice indicator 311 which can sense ice formation in the engine induction system, is exposed to the outflow. This arrangement or other suitable mechanism may be employed to position a three-way valve 306 through a system of interconnecting links including a tie rod 310, a bell crank 309, a tie rod 308, and an arm 307 in order to control the temperature in the region 20a. The valve 306 communicates with a duct 305 bleeding relatively hot exhaust vapor from the turbine 82 and also regulates the flow of relatively cool condensate from the tube 27 into the region 20a.

Accordingly, if ice is indicated at 311 or if a deficient temperature is sensed, the exhaust vapor is allowed to bypass the condenser 99 by means of the duct 305 and to pass along the region 20a to become condensed by heating of the engine air. The condensate is then withdrawn from the region 20a by a pump 231 connected to the outlet 26. The exact form of the indicator 311 is immaterial to the invention and such indicators are commonly used.

A thermostat 315 in the cabin 216 actuates another three-way valve 312 located at the junction of a duct 304 with the ring 20, by means of a tie rod 314 and an arm 313. If the cabin temperature is subnormal, the valve 312 admits relatively hot vapor from the turbine 82 along the duct 304 to the region 20b. The vapor becomes condensed as it heats the air being supplied to the pressure cabin and is finally discharged as liquid into the outlet 26.

If the ice indicator 311 senses no ice formation tendency or if the thermostat 315 senses excessive temperature in the cabin, the valves 306 and 312 become rotated by their linkages to reduce the flow of hot vapor into the regions 20a and 20b respectively.

If the valves 306 and 312 have been rotated far enough to close off the ducts 304 and 305, relatively cool condensate is admitted from the tube 27 into the regions 20a and 20b to absorb heat from the compressed air, thereby achieving heat utilization and reducing the temperature of the air supplied to the engine and to the pressure cabin. It is obvious that the valves 306 and 312 operate entirely independently subject to their automatic controls and through an infinite variation of openings to maintain desired conditions in the engine air or in the pressure cabin air. In addition, the controls may be manually biased through the knob 330 attached to the bell crank 309. Accordingly the operator of the aircraft may vary the temperature conditions imposed upon the engine. Thus the engine may be heated, in order to reduce the length of its starting period.

The valves 306 and 312 are capable of completely sealing off the flow from the pump 30 into the tube 20 and therefore some serial ducts 316 and 320 are brought into communication between the tube 27 and the outlet 26. A back-pressure valve 319 is included between the ducts 316 and 320. The valve 319 comprises a ball 317 forced against the duct 316 by a spring 318, so that positive pressure exists at all times within the tube 27, yet liquid may escape from the tube 27 when the valves 306 or 312 isolate the tube 27 from the regions 20a and 20b.

Some radial walls 20c and 20d in the space between the tube 21 and the barrel 75 separate the compressed air for the engine from that for the pressure cabin.

The pump 231 is driven by an aircraft propulsion engine 200. The discharge from the pump 231 enters the engine 200 where it cools the engine by absorption of heat. Accordingly working vapor issues from the engine along a duct 303 to a throttle 81. The throttle 81 is employed for regulation of the flow of working vapor along an inlet tube 230 to the turbine 82, thereby adjusting the rate of speed of the supercharger to control the power developed in the engine.

The separately fired boiler 301 is connected in parallel to the engine cooling system, in order to generate working vapor from condensate bled from the outlet 26 by a duct 300. The vapor so formed is delivered along a duct 302 to the throttle 81. Thus the turbine 82 can operate by waste heat recovered during power plant operation and can be revolved by working vapor from the boiler 301 when the engine 200 is not in operation.

Figures 6, 7, and 8 illustrate a radial engine 200, which includes eight cylinder banks 202 mounted upon a cylindrical crankcase 204 having an axis B. Four exhaust manifolds 201 are located between alternate pairs of the banks 202. Four air induction manifolds 203 are positioned between the remaining pairs of the banks 202. This form of engine lends itself particularly to compact installation with the supercharger unit in a conoidal fairing 207 extending rearward from the pressure cabin 216.

As shown in Figures 6 and 7, the supercharger unit 100 is preferably placed between the engine 200 and the pressure cabin 216 with the axis A normal to the axis B. Exhaust cooling air from the condenser is expelled rearward at the outside surface of the fairing 207 from a nozzle 213. A propulsive jet 215 issues from the nozzle 213.

In Figure 7 the compressed air from the supercharger outlet 72 is transferred into the induction manifolds 203 by a quadruple distributor duct 220. The engine exhaust gas issues from four rearwardly directed nozzles 206, which are attached to the ends of the manifolds 201 and which protrude through cut-out portions 232 in the fairing 207. Propulsive exhaust jets 210 are produced at the nozzles 206. A drive shaft 205 along the axis B enters a gear box 227 for driving some hubs 208 and 212 of counter rotating propellers 209 and 211, at the terminus of the fairing 207. In Figure 6 the somewhat modified installation involves the transfer of the compressed air from the outlet 72 into a second stage engine-driven supercharger 219, along a duct 218. The supercharger 219 is attached to the rear of the crankcase 204. The distributor duct 220 extends from the periphery of the supercharger 219.

In the installation represented by Figure 7 the major portion of the propulsive thrust at lower altitudes and at relatively low aircraft speed is accomplished through the propellers 209 and 211, but at higher altitudes and during increased aircraft velocity the propulsive effect of the nozzles 206 may predominate.

The installation represented by Figure 6 is adapted for extremely high velocity at high altitudes. In coordination with the novel functions of the unit 100 for these conditions, arrangements are provided for withdrawal of the propeller from the atmospheric air stream, in order to allow the engine to act merely as a combustion chamber for production of jet propulsion. Ordinarily the engine will operate at comparatively low speed and with relatively high pressure in the induction manifold while it is driving the propeller. However when the engine is disconnected from the propeller and the propeller retracted from the air stream, the speed of the engine increases considerably due to the absence of torque delivery to the propeller. Accordingly the induction rate and the rate of exhaust gas flow greatly increase and the jet propulsion effect becomes more pronounced. Delayed combustion in the engine under this condition of high speed is not disadvantageous because the exhaust gas is delivered from the manifolds 201 into an exhaust collector tube 221 in which the combustion may be completed prior to a rearwardly directed propulsive nozzle 222 at the terminus of the fairing 207.

Some propeller blades 226 are mounted upon a toroidal hub 223 rotated about the axis B and merging into the fairing 207 directly behind the engine 200. The hub 223 surrounds the tube 221 and is driven at its inner diameter by some pinions 229 at the ends of some shafts 228 extending from the engine parallel to the axis B. During flight at relatively low altitude the power plant delivers the larger portion of its propulsive thrust through the blades 226, but as the altitude and speed increase the blades tend to become inefficient and may absorb rather than deliver thrust.

Under the latter condition the nozzle 222 becomes highly effective as a propulsive method. Therefore a knob 400 is actuated by the aircraft operator or by suitable controls to de-clutch the engine from the blades 226. The mechanism for accomplishing this includes a bell crank 402 attached to the knob 400 and having a tab 403, which cooperates with a block 401 on the shafts 228 to force the pinions 229 toward the axis B and out of engagement with the hub 223. Then the blades 226, which are pivotally mounted upon the hub 223 by some tangentially disposed pins 224, are no longer held in the plane of rotation by centrifugal force and therefore are blown backward by the atmospheric air into the position indicated by 225 which generally conforms to the shape of the fairing 207 offering no parasitic resistance to motion of the aircraft at extremely high velocities.

During the jet propulsion the speed of the aircraft may be varied by change of engine speed, which in turn controls the rate of flow of exhaust gas. The degree of supercharging is a function of the waste heat available in the engine and this heat tends to be present in a quantity proportionate to the exhaust gas output of the engine. Heat transmission in the engine is a function of the rate of flow of combustibles through the cylinder banks. Accordingly the heat conversion processes in the supercharger unit consume the heat dissipated from the engine and the quantity of heat tends to approximate the supercharging power requirements.

I claim:

1. An aircraft supercharger comprising a rotary air impeller, a shaft for said impeller, a turbine for driving said shaft, a toroidal air diffuser for said impeller, said diffuser being composed of closely spaced plates, a toroidal condenser core for waste vapor joined to said turbine, said core having longitudinal tubes communicating with said turbine and generally radial interstices for passage of cooling air, a region of said impeller containing air at relatively low pressure, and an air discharge duct extending from said region to said interstices.

2. A supercharger as defined in claim 1 and further characterized by said tubes being relatively narrow in a tangential direction with respect to said core and relatively wide in a radial direction with respect to said core, and spaced strips extending longitudinally within said tubes and being thermally bonded to said tubes.

3. An aircraft supercharger comprising a generally cylindrical casing having an air inlet adjacent to one end thereof and a discharge connection for compressed air in said casing, an axial shaft enclosed within said casing, a centrifugal air impeller fixed to one end of said shaft adjacent to said inlet, means for driving said shaft, a toroidal core lying adjacent to the periphery of said impeller, said core having spaced plates forming a communication between said impeller and said connection, a conduit thermally bonded to said plates, and means for forcing a fluid at a temperature differing from that of the air being discharged from said impeller along said conduit.

4. A supercharger for a space in a high altitude aircraft, including generally coaxial elements comprising a rotary air impeller, a shaft for said impeller, a toroidal air diffuser adjacent to the periphery of said impeller, a turbine for driving said shaft, an exhaust vapor condenser core joined to said turbine, a generally cylindrical casing encompassing said elements, an inlet aperture in said casing for supplying said impeller with air, a pressure air outlet connection in said casing communicating with said diffuser, a waste air spill in the end of said casing communicating with said core, interstices for cooling air in said core, a region of said impeller containing air at relatively low pressure, an air discharge duct extending from said region to said interstices, a central recess in said core forming a communication between said interstices and said spill, a conduit in the thermal contact with said diffuser, a pump located at said recess, said pump forcing condensate from said core along said conduit, and a drive extending from said turbine to said pump.

5. An aircraft supercharger comprising a generally cylindrical casing, generally coaxial elements encompassed by said casing including a shaft, a journal for said shaft, a wall for supporting said journal in said casing, a rotary air impeller at one end of said shaft, a conoidal turbine wheel at the other end of said shaft and having an apex pointing away from said impeller, a working vapor exhaust chamber adjacent to said apex, an inlet aperture in said casing for supplying air to said impeller, a compressed air outlet in said casing, a toroidal condenser core for said turbine lying adjacent to said chamber, said core having longitudinal tubes for exhaust vapor extending from said chamber and transverse interstices for cooling air, an air diffuser in said wall, and an annular flow space for air from said diffuser encompassing said turbine and communicating with said interstices.

6. A supercharger for use in conjunction with a high altitude aircraft engine, comprising generally coaxial elements joined together as a unit including a rotary air impeller, a toroidal air diffuser for said impeller composed of closely spaced plates, a toroidal conduit in thermal contact with said plates having an inlet and an outlet, and a turbine for driving said impeller having an admission and an exhaust end, a vapor condenser joined to said exhaust end, a condensate duct leading from said condenser to said inlet, a working vapor supply connection communicating with said turbine, a region of said impeller containing air at relatively low pressure, and an air discharge duct extending from said region to said condenser.

7. An aircraft supercharger comprising generally coaxial elements including a rotary air impeller, an annular pressure air duct including closely spaced fins communicating with said impeller, an annular cooling air duct encompassed by said pressure air duct, a turbine for driving said impeller encompassed by said cooling air duct, a working vapor condenser having an air swept portion and a vapor swept portion connected to said turbine, said cooling air duct forming a communication between said impeller and said air swept portion, a toroidal condensate duct in thermal contact with said fins, and said vapor swept portion being connected to said condensate duct.

8. A supercharger comprising generally coaxial elements including, a rotary air impeller having a hub and generally radially disposed air impelling blades, an axial air inlet at one side of said impeller, a high pressure air outlet at the periphery of said impeller, a low pressure air outlet at the opposite side of said impeller relatively near the axis of said impeller, a turbine adjacent to said low pressure outlet for driving said impeller, a working vapor condenser attached to said turbine, and a duct connecting said low pressure outlet to said condenser.

9. A supercharger for a space in a high altitude aircraft, including generally coaxial elements comprising a rotary air impeller, a shaft for said impeller, a toroidal air diffuser adjacent to the periphery of said impeller, a turbine for driving said shaft, an exhaust vapor condenser core joined to said turbine, a generally cylindrical casing encompassing said elements, an air inlet aperture in said casing adjacent to said impeller, a pressure air outlet connection in said casing communicating with said diffuser, a waste air spill for said core in said casing, interstices for cooling air in said core, a toroidal conduit in thermal contact with said diffuser, said conduit being connected to said core, a region of said impeller containing air at relatively low pressure, an air discharge duct extending from said region to said interstices.

10. A supercharger for a space in a high altitude aircraft, including generally coaxial elements enclosed in a generally cylindrical casing comprising a rotary air impeller, a toroidal air diffuser adjacent to the periphery of said impeller, a turbine for driving said impeller, a toroidal conduit in thermal contact with said diffuser, a condenser core joined to an end of said turbine, a working vapor flow course being serially extended through said conduit, said turbine and said core, a region of said impeller containing air at relatively low pressure, and an air discharge duct extending from said region to said core.

NATHAN C. PRICE.